(12) United States Patent
Kanda et al.

(10) Patent No.: US 11,036,073 B2
(45) Date of Patent: Jun. 15, 2021

(54) OPTICAL MEMBER, POLARIZATION MEMBER, AND DISPLAY DEVICE

(71) Applicant: SAMSUNG ELECTRONICS CO., LTD., Suwon-si (KR)

(72) Inventors: Tomomichi Kanda, Yokohama (JP); Yoshihiro Yokote, Yokohama (JP); Osamu Konuma, Yokohama (JP); Katsutoshi Sasaki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 16/058,658

(22) Filed: Aug. 8, 2018

(65) Prior Publication Data

US 2019/0049639 A1  Feb. 14, 2019

(30) Foreign Application Priority Data

Aug. 8, 2017  (JP) ................................. 2017-153402
May 3, 2018  (KR) ......................... 10-2018-0051464

(51) Int. Cl.
*G02B 1/111* (2015.01)
*G02F 1/1335* (2006.01)
(Continued)

(52) U.S. Cl.
CPC .......... *G02F 1/133504* (2013.01); *G02B 1/11* (2013.01); *G02B 1/111* (2013.01);
(Continued)

(58) Field of Classification Search
CPC ... G02B 1/11; G02B 2207/107; G02B 5/0231
See application file for complete search history.

(56) References Cited

U.S. PATENT DOCUMENTS 6,343,865 B1 * 2/2002 Suzuki ................. G02B 5/0242
  359/601
7,244,494 B2 * 7/2007 Iijima ...................... G02B 1/11
  428/328
(Continued)

FOREIGN PATENT DOCUMENTS

EP  2749912 A1  7/2014
JP  2009-272059 A  11/2009
(Continued)

OTHER PUBLICATIONS

International Search Report (PCT/ISA/210) and Written Opinion (PCT/ISA/237) dated Nov. 15, 2018 issued by the International Searching Authority in International Application No. PCT/KR2018/008892.
(Continued)

*Primary Examiner* — Christopher Stanford
(74) *Attorney, Agent, or Firm* — Sughrue Mion, PLLC

(57) ABSTRACT

An optical member, a polarization member, and a display device are provided. The optical member includes a substrate, and a functional layer provided on the substrate, the functional layer including a high refractive layer and a low refractive layer, wherein the high refractive layer has a higher refractive index than that of the substrate and a diffraction grating structure, and the low refractive layer has a lower refractive index than that of the high refractive layer, wherein an interface between the substrate and the high refractive layer and an interface between the high refractive layer and the low refractive layer are in states in which components of the respective layers with the respective interfaces therebetween are compatible with each other.

19 Claims, 8 Drawing Sheets

(51) Int. Cl.
*G02B 5/18* (2006.01)
*G02B 1/11* (2015.01)
*G02B 5/30* (2006.01)
*G02F 1/13357* (2006.01)

(52) U.S. Cl.
CPC ............. *G02B 5/18* (2013.01); *G02B 5/1814* (2013.01); *G02B 5/1871* (2013.01); *G02B 5/3025* (2013.01); *G02F 1/133502* (2013.01); *G02F 1/133606* (2013.01); *G02F 1/133607* (2021.01)

(56) References Cited

U.S. PATENT DOCUMENTS

| | | | | |
|---|---|---|---|---|
| 7,991,257 | B1* | 8/2011 | Coleman | B29D 11/0073 264/1.24 |
| 8,072,673 | B2* | 12/2011 | Kim | G02F 1/1303 106/287.1 |
| 8,236,408 | B2* | 8/2012 | Matsui | G02B 1/16 428/172 |
| 8,619,363 | B1* | 12/2013 | Coleman | G02B 5/0242 359/576 |
| 8,652,619 | B2* | 2/2014 | Murata | B29D 11/0073 428/212 |
| 8,736,958 | B2* | 5/2014 | Murata | G02B 27/4211 359/576 |
| 9,214,649 | B2 | 12/2015 | Inada et al. | |
| 9,595,648 | B2 | 3/2017 | Inada et al. | |
| 9,625,624 | B2 | 4/2017 | Oh et al. | |
| 9,915,826 | B2* | 3/2018 | Tekolste | G02B 5/1842 |
| 10,371,898 | B2* | 8/2019 | Evans | G02B 6/34 |
| 2004/0012855 | A1* | 1/2004 | Allen | G02B 1/04 359/487.02 |
| 2005/0077820 | A1 | 4/2005 | Onishi et al. | |
| 2006/0006778 | A1 | 1/2006 | Lee et al. | |
| 2006/0113901 | A1* | 6/2006 | Oh | H01L 51/5262 313/504 |
| 2007/0285778 | A1* | 12/2007 | Walker | G02B 1/111 359/485.03 |
| 2007/0286993 | A1* | 12/2007 | Radcliffe | G02B 1/111 428/212 |
| 2012/0307191 | A1 | 12/2012 | Park et al. | |
| 2013/0011608 | A1* | 1/2013 | Wolk | C09J 133/08 428/141 |
| 2013/0057955 | A1 | 3/2013 | Kodama et al. | |
| 2013/0170041 | A1 | 7/2013 | Okada et al. | |
| 2013/0273317 | A1* | 10/2013 | Nakayama | C09D 5/006 428/141 |
| 2014/0139923 | A1* | 5/2014 | Murata | G02B 3/08 359/576 |
| 2014/0227482 | A1* | 8/2014 | Shibata | G02B 1/04 428/141 |
| 2015/0056412 | A1* | 2/2015 | Yu | C08J 7/0423 428/147 |
| 2016/0187699 | A1 | 6/2016 | Ju et al. | |
| 2016/0252665 | A1 | 9/2016 | Lee et al. | |

FOREIGN PATENT DOCUMENTS

| | | |
|---|---|---|
| JP | 2013-3266 A | 1/2013 |
| JP | 2013-205752 A | 10/2013 |
| JP | 2014-806 A | 1/2014 |
| JP | WO2014/167758 A1 | 10/2014 |
| JP | 2015-90799 A | 5/2015 |
| JP | 2015-144110 A | 8/2015 |
| JP | 2016-161943 A | 9/2016 |
| JP | 2017-33908 A | 2/2017 |
| KR | 10-2012-0133084 A | 12/2012 |
| KR | 10-2014-0141352 A | 12/2014 |
| WO | 2016/047045 A1 | 3/2016 |
| WO | 2017/001424 A1 | 1/2017 |

OTHER PUBLICATIONS

Communication dated Jun. 19, 2020 issued by the European Patent Office in European Application No. 18843554.9.

* cited by examiner

FIG. 6

| | | EXAMPLE 1 | RELATED EXAMPLE 1 | RELATED EXAMPLE 2 |
|---|---|---|---|---|
| COMPONENTS | SUBSTRATE | TAC | TAC | TAC |
| | HIGH REFRACTIVE LAYER(n) | PRESENT(1.61) | ABSENT | PRESENT(1.61) (INCOMPATIBLE) |
| | LOW REFRACTIVE LAYER(n) | PRESENT(1.50) | ABSENT | PRESENT(1.50) |
| | ANTI-REFLECTIVE FILM | PRESENT | ABSENT | PRESENT |
| FRONT LUMINANCE MAINTENANCE RATE | | 96% | 100% | 89% |
| FRONT CONTRAST MAINTENANCE RATE | | 86% | 100% | 76% |
| 45° CONTRAST MAINTENANCE RATE | | 38% | 30% | 38% |
| REFLECTIVITY (SCI) | | 0.23% | 4.10% | 0.52% |
| POOR APPEARANCE (MOIRE, RAINBOW UNEVENNESS) | | ABSENT | ABSENT | PRESENT |

FIG. 7A

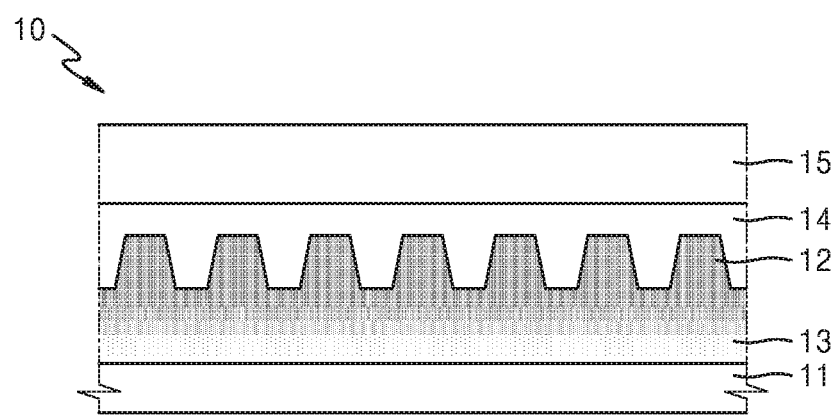

OPTICAL MEMBER, POLARIZATION MEMBER, AND DISPLAY DEVICE

CROSS-REFERENCE TO RELATED APPLICATIONS

This application is based on and claims priority under 35 U.S.C. § 119 to Japanese Patent Application No. 2017-153402, filed on Aug. 8, 2017, in the Japanese Patent Office and Korean Patent Application No. 10-2018-0051464, filed on May 3, 2018, in the Korean Intellectual Property Office, the disclosures of which are incorporated by reference herein in their entireties.

BACKGROUND

1. Field

The disclosure relates to optical members, polarization members, and display devices, and more particularly, to optical members, polarization members, and display devices having improved contrast and visibility with no reflection of light in an interface between two layers having a diffraction grating structure and refractive indexes that are different from each other.

2. Description of Related Art

Display devices such as a liquid crystal display (LCD) televisions (TVs) display an image visually recognized via selective transmission of light emitted from a backlight installed at a back side of a liquid crystal panel. According to such a display method, higher contrast may be obtained from a front direction which is a direction normal to a display surface of the liquid crystal panel. Meanwhile, according to the display method, leakage of light may occur due to a phase difference in an oblique direction which is a wide angle direction deviating from the front direction. Although a phase difference compensation film may be used to correct light leakage, effects thereof may not be satisfactory. Thus, according to the display method, lower contrast in a wide angle direction than that of self-emitting display devices may be obtained.

In this regard, light may be emitted at a wider angle from a display device, according to the related art. For example, a method of diffusing light by dispersing particles having different refractive indexes in a transparent material that transmits light may be used. Thus, light is emitted from the display device at a wider angle. However, back scattering of reflected external light may occur, thereby reducing contrast or visibility of images.

For example, methods of emitting light at a wide angle via diffraction of light by using a diffraction grating structure have been developed. such as a light diffusion member that diffuses light entering in a direction substantially parallel to a normal direction of an incidence plane in a predetermined range. The light diffusion member transmitting light includes laminated first and second layers, and has an uneven diffraction structure formed in an interface between the first and second layers. In addition, the first layer and the second layer having the interface interposed therebetween have different refractive indexes from each other. A light diffusion film may include a diffractive structure body having a diffractive structure that scatters and emits light entering in a direction substantially parallel to a normal direction of an incident surface, and may include an anti-reflective layer inhibiting surface reflection and be arranged at a side where light is scattered by the diffractive structure.

However, according to the related art, reflected light may be easily generated at an interface between two layers having a diffraction grating structure and refractive indexes different from each other. Thus, an increase in a difference in refractive indexes to obtain effects of diffraction may increase reflectivity, thereby leading to deterioration of contrast and visibility.

SUMMARY

Provided are optical members, polarization members, and display devices having improved contrast and visibility with no reflection of light in an interface between two layers having a diffraction grating structure and a relatively large difference between their respective refractive indexes.

Additional aspects will be set forth in part in the description which follows and, in part, will be apparent from the description, or may be learned by practice of the presented embodiments.

In accordance with an aspect of the disclosure, there is provided an optical member including a substrate, and a functional layer provided on the substrate, the functional layer including a high refractive layer and a low refractive layer, wherein a refractive index of the high refractive layer is higher than a refractive index of the substrate, and the high refractive layer has a diffraction grating structure, wherein a refractive index of the low refractive layer is lower than the refractive index of the high refractive layer, wherein a first interface between the substrate and the high refractive layer is in a state in which components of the substrate and the high refractive layer are compatible with each other, and wherein a second interface between the high refractive layer and the low refractive layer is in a state in which components of the high refractive layer and the low refractive layer are compatible with each other.

The substrate, the high refractive layer, and the low refractive layer may be sequentially stacked.

The high refractive layer may include a polymerization product of a monomer configured to erode a component of the substrate.

The monomer includes at least one functional group selected from a morpholino group and an amide group.

The high refractive layer may include a polymerization product of a monomer including one or two polymerizable functional groups.

The low refractive layer may include a component eroding the high refractive layer.

The low refractive layer may include a polymer of a monomer including three or more polymerizable functional groups.

A thickness of a compatible portion of each of the interfaces may be equal to or greater than a wavelength of visible light.

The thickness of the compatible portion of each of the interfaces may be about 400 nm to about 2 μm.

The substrate may be formed of triacetylcellulose (TAC).

A difference between the refractive index of the high refractive layer and the refractive index of the low refractive layer may be equal to or higher than 0.05.

The optical member may further include an anti-reflective layer configured to suppress reflection of external light.

The anti-reflective layer may be provided on an outermost layer of the optical member.

The anti-reflective layer may include a binder including a photopolymerization product of a mixture of a side-chain reactive photo-polymerizable fluorine polymer and a siloxane compound, hollow silica particles included in the binder, and a modified silicone and a photopolymerization product of a one-end reactive photopolymerization productizable fluoropolymer being distributed at a surface of the anti-reflective layer, respectively.

In accordance with another aspect of the disclosure, there is provided a polarization member including a polarizer configured to polarize light, and a functional layer provided on the polarizer, the functional layer including a high refractive layer and a low refractive layer, wherein a refractive index of the high refractive layer is higher than a refractive index of the polarizer, and the high refractive layer has a diffraction grating structure, wherein a refractive index of the low refractive layer is lower that the refractive index of the high refractive layer, wherein a first interface between the polarizer and the high refractive layer is in a state in which components of the polarizer and the high refractive layer are compatible with each other, and wherein a second interface between the high refractive layer and the low refractive layer is in a state in which components of the high refractive layer and the low refractive layer are compatible with each other.

The high refractive layer includes a polymerization product of a monomer configured to erode a component of the polarizer, and the low refractive layer includes a component eroding the high refractive layer.

The monomer has at least one from a morpholino group and an amide group.

The high refractive layer may include a polymerization product of a monomer including one or two polymerizable functional groups, and the low refractive layer may include a polymerization product of a monomer including three or more polymerizable functional groups.

In accordance with another aspect of the disclosure, there is provided a display device including a display, and a functional layer provided on the display, the functional layer including a high refractive layer and a low refractive layer, wherein a refractive index of the high refractive layer is higher than a refractive index of the display, and the high refractive layer has a diffraction grating structure, wherein a refractive index of the low refractive layer is lower than the refractive index of the high refractive layer, wherein a first interface between the display and the high refractive layer is in a state in which components of the display and the high refractive layer are compatible with each other, and wherein a second interface between the high refractive layer and the low refractive layer is in a state in which components of the high refractive layer and the low refractive layer are compatible with each other.

The high refractive layer includes a polymer of a monomer configured to erode a component of the display, and the low refractive layer includes a component configured to erode the high refractive layer.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a table illustrating evaluation results; and

FIGS. 7A to 7E are views illustrating a stacking sequence of layers of a functional film according to an embodiment.

DETAILED DESCRIPTION

Figure 1A:
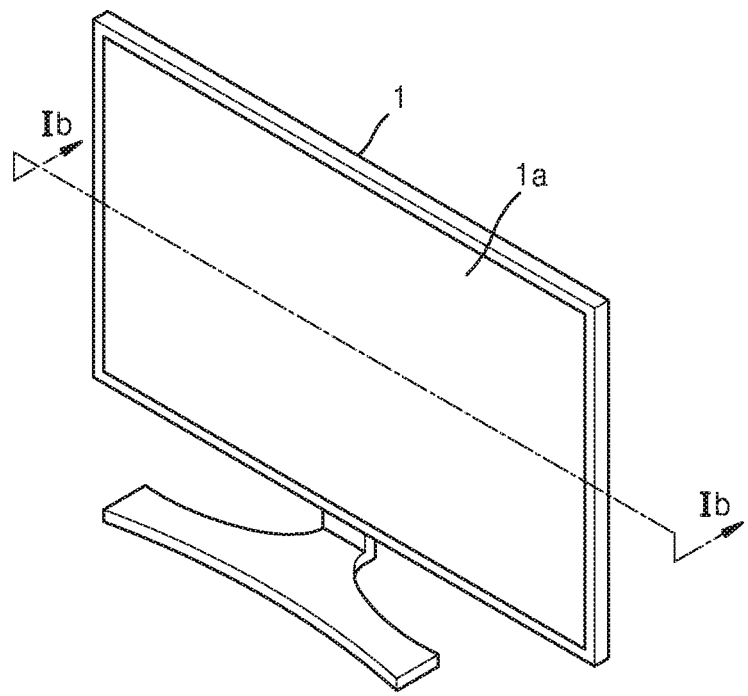
FIG. 1A is a view illustrating a display device according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects. The embodiments described in the specification and shown in the drawings are only illustrative and are not intended to represent all aspects of the disclosure, such that various equivalents and modifications may be made without departing from the spirit of the disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used throughout the specification are merely used to describe particular embodiments, and are not intended to limit the present disclosure. Also, it is to be understood that the terms such as "include", "have", or the like, are intended to indicate the existence of the features, numbers, operations, components, parts, ingredients, materials, or combinations thereof disclosed in the specification, and are not intended to preclude the possibility that one or more other features, numbers, operations, components, parts, ingredients, materials, or combinations thereof may exist or may be added. The "I" used herein may be interpreted as "and" or "or" depending on the situation.

In the drawings, diameters, lengths or thicknesses may be enlarged or reduced to clearly illustrate various components, layers, and regions. Like reference numerals in the drawings denote like elements. It will also be understood that when an element such as a layer, a region or a substrate is referred to as being "on" another element, it can be directly on the other element, or intervening elements may also be present. In this specification, terms "first", "second," etc. are used to distinguish one component from other components and, therefore, the components are not limited by the terms. In this specification, terms "first", "second," etc. are used to distinguish one component from other components and, therefore, the components are not limited by the terms. In the drawings, components unrelated to the descriptions are omitted for clear description of the disclosure. However, it is not intended to preclude another component not illustrated in the drawings.

FIG. 1A is a view illustrating a display device according to an embodiment.

An illustrated display device 1 is a liquid crystal display for a LCD TV or a personal computer. The display device 1 displays an image on a display screen 1a.

Figure 1B:
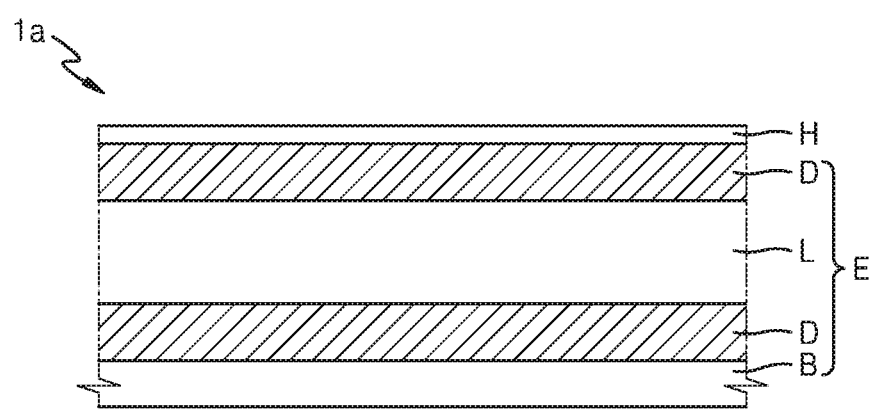
FIG. 1B is a cross-sectional view taken along line 1b-1b of FIG. 1A, illustrating a structure of a display screen according to an embodiment.

FIG. 1B is a cross-sectional view of FIG. 1A taken along line 1b-1b illustrating a structure of the display screen 1a according to the embodiment.

The display screen 1a includes a liquid crystal panel E, as an example of a display configured to display an image, and a functional layer H formed on the surface thereof.

As illustrated herein, the liquid crystal panel E includes a liquid crystal layer L, polarizing films D formed on upper and lower surfaces of the liquid crystal layer L, and a backlight B located on a lower surface of a lower polarizing film D in the drawing.

Upper and lower polarizing films D are polarizers that polarize light in directions perpendicular to each other. The polarizing film D includes, for example, a resin film prepared by adding molecules of an oxo compound to polyvinyl alcohol (PVA). The resin film is interposed between resin films formed of triacetylcellulose (TAC) and adhered thereto to form the polarizing film D. Light is polarized by the molecules of the oxo compound. In addition, the backlight B may be a cold cathode fluorescent lamp or a white light emitting diode (LED). However, the backlight B is not limited thereto other light source may be used.

A power source is connected to the liquid crystal layer L. When a voltage is applied to the liquid crystal layer L by the power source, a direction of molecular arrangement of the liquid crystal layer L is changed. In addition, when the backlight B emits light, light is polarized by the lower polarizing film D while passing therethrough. When the liquid crystal panel E is a TN type liquid crystal panel, the polarized light passes therethrough while a voltage is applied to the liquid crystal E. The upper polarizing film D having a different polarization direction from the lower polarizing film D blocks the polarized light. A polarization direction of the polarized light rotates 90° by the liquid crystal panel E when a voltage is not applied to the liquid crystal E. Thus, the upper polarizing film D may not block but transmit the polarized light. Thus, transmission of light may be controlled by applying a voltage to the liquid crystal panel E, and an image may be displayed thereby. A color image may also be displayed by using a color filter. According to an embodiment, the polarizing film D may include a high refractive layer 12, a low refractive layer 13, an adhesive layer 14, and an anti-reflective layer 15.

Figure 1C:
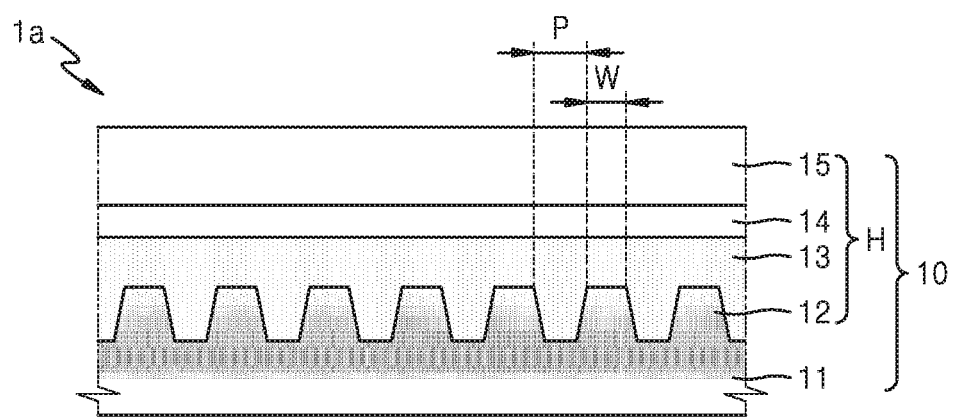
FIG. 1C is an enlarged view illustrating an outermost portion of the display screen of FIG. 1B.

FIG. 1C is an enlarged view of FIG. 1B illustrating a functional layer H of the display screen 1a.

Here, the functional layer H includes a high refractive layer 12, a low refractive layer 13, an adhesive layer 14, and an anti-reflective layer 15. The polarizing film D includes a substrate 11 at an outermost layer of the polarizing film D. Also, the substrate 11, the high refractive layer 12, the low refractive layer 13, the adhesive layer 14, and the anti-reflective layer 15 may be used as the functional film 10. When these layers are recognized as the functional film 10, the functional film 10 may be configured to provide optical functions to the liquid crystal panel E. The functional film 10 may be an example of an optical member according to an embodiment.

The substrate 11 included in the functional film 10 may be, for example, a transparent substrate having a total light transmittance of 85% or more, 90% or more, or 95% or more. The substrate 11 may be formed of a TAC, but is not limited thereto, and other materials may be used to form the substrate 11, such as, for example, polyethylene terephthalate (PET). The substrate 11 may have a thickness of, for example, about 20 μm to about 200 μm, without being limited thereto.

The high refractive layer 12 is formed on the substrate 11 and has a higher refractive index than that of the substrate 11.

The high refractive layer 12 includes a polymer of a monomer that may erode a component of the substrate 11. Based on the erosion of the substrate 11, an interface between the substrate 11 and the high refractive layer 12 becomes a state in which components of the substrate 11 and the high refractive layer 12 are compatible with each other, which includes a state in which components of each layers are non-homogeneously mixed and/or a state in which the components of each layers are homogeneously mixed.

The monomer eroding a component of the substrate 11 includes at least one functional group selected from a morpholino group and an amide group. A high refractive layer-forming coating solution is applied to the substrate 11 and cured to form the high refractive layer 12. In this case, when TAC is used to form the substrate 11, reaction between a monomer having a morpholino group or an amide group and TAC occurs, thereby eroding the substrate 11. As a result, the interface between the substrate 11 and the high refractive layer 12 becomes a state in which components thereof are compatible with each other. A compatible portion has a thickness of, for example, a visible light wavelength or more. Thus, reflectivity of external light may be reduced.

The monomer eroding a component of the substrate 11 has, for example, a polymerizable functional group such as a photo-polymerizable functional group or a thermal polymerizable functional group. Thus, a molecular weight of the high refractive layer 12 increases by photo-polymerization or thermal polymerization, and a stronger high refractive layer 12 may be formed by curing.

The monomer having a morpholino group or an amide group as a functional group may include, for example, a 4-acryloyl morpholino (ACMO) available from KJ Chemicals Corporation.

Similarly, the monomer having a photo-polymerizable functional group may include, for example, a (meth)acrylamide-based monomer.

The (meth)acrylamide-based monomer may be, for example, (meth)acrylamide, N-alkyl(meth)acrylamide, and N,N-dialkyl(meth)acrylamide.

Examples of N-alkyl(meth)acrylamide may include N-ethyl(meth)acrylamide, N-n-butyl(meth)acrylamide, and N-octylacrylamide. In addition, examples of amino-containing (meth)acrylamide may include dimethylaminoethyl (meth)acrylamide and diethylaminoethyl(meth)acrylamide.

Examples of N,N-dialkyl(meth)acrylamide may include N,N-dimethyl(meth)acrylamide, N,N-diethyl(meth)acrylamide, N,N-dipropyl(meth)acrylamide, N,N-diisopropyl (meth)acrylamide, N,N-di(n-butyl)(meth)acrylamide, and N,N-di(t-butyl)(meth)acrylamide.

Examples of N,N-dialkyl(meth)acrylamide may include N,N-diethylacrylamide (DEAA), N,N-dimethylacrylamide (DMAA), N-n-butoxymethylacrylamide (NBMA), N,N'-methylenebis acrylamide (MBAA), N-methoxymethylacrylamide (NMMA), N-isobutoxymethylacrylamide (IBMA), N-(2-hydroxyethyl)acrylamide (HEAA), diacetoneacrylamide (DAMM), and N-t-butyl acrylamide (TBAA).

The high refractive layer 12 may have a refractive index greater than 1.5 and include a polymer of a monomer having one or two polymerizable functional groups. By limiting the number of the polymerizable functional group to one or two, erosion of the high refractive layer 12 after polymerization may be controlled.

The polymerizable functional group may be, for example, a photo-polymerizable functional group. The photo-polymerizable functional group is a functional group polymerized by light such as ultraviolet (UV) light, without being limited thereto. Examples of the photo-polymerizable functional group may include an acryloyl group or a methacryloyl group, without being limited thereto. The polymerizable functional group may be, for example, a thermal polymerizable functional group. The thermal polymerizable functional group may be any functional group polymerizable by heat, without being limited thereto. Examples of the thermal polymerizable functional group may include a maleimide group, a nadimide group, a phthalimide group, a cyanate group, a nitrile group, a phthalonitrile group, a styryl group, an ethynyl group, a propagyl ether group, a benzocyclobutane group, a biphenylene group, or substituents or derivatives of the afore-mentioned functional groups.

According to an embodiment, a monomer having one or two photo-polymerizable functional groups may be used as the polymerizable functional group. In this case, a monomer having one photo-polymerizable functional group may be used alone, a monomer having two photo-polymerizable functional groups may be used alone, or a combination thereof may be used. Examples of the monomer having one or two photo-polymerizable functional groups may include ethoxylated o-phenylphenol acrylate (A-LEN-10), ethoxylated bisphenol A diacrylate (ABE-300), ethoxylated bisphenol A diacryalte (A-BPE-4), 9,9-bis[4-(2-acryloyl oxyethoxy)phenyl]fluorene (A-BPEF), 2-methacryloyloxy ethylphthalic acid (CB-1), and ethyoxylated biaphenol A dimethacryalte (BPE-100) available from Shin Nakamura Chemical Co., Ltd.

The high refractive layer 12 may have a diffraction grating structure. That is, the high refractive layer 12 may have a cross-section of a grating pattern. According to an embodiment, the high refractive layer 12 includes a plurality of grooves extending downward from the upper surface thereof. Although the cross-section of the diffraction grating structure is trapezoidal in the drawing, the shape of the cross-section of the diffraction grating structure is not limited thereto. For example, the cross-section may have a triangular shape, a sawtooth shape, a circular shape, or an oval shape, without being limited thereto.

A line width W of the diffraction grating structure may be, for example, from about 2 μm to about 50 μm. Also, a pitch P of the diffraction grating structure may be, for example, from about 2 μm to about 50 μm.

Figure 2A:
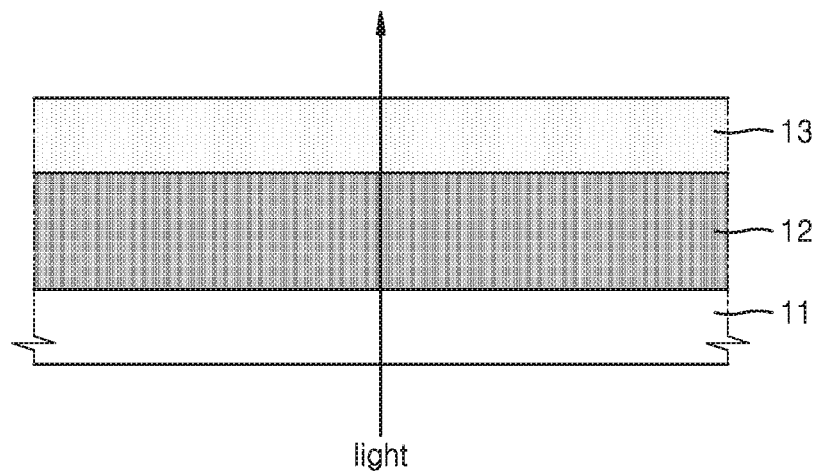
FIGS. 2A and 2B are diagrams for describing effects of a diffraction grating structure.
Figure 2B:
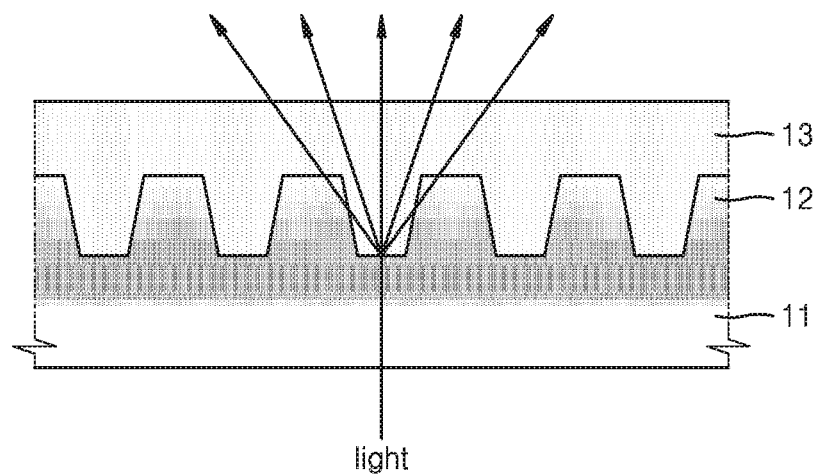

FIGS. 2A and 2B are diagrams for describing effects of a diffraction grating structure.

FIG. 2A illustrates a path of light emitted from the backlight B when the high refractive layer 12 does not have a diffraction grating structure.

As illustrated in the drawing, light emitted from the backlight B propagates straight in an upward direction. In this case, while relatively high contrast may be obtained in a direction where light propagates straight, contrast may deteriorate in a wide angle direction other than the straight direction due to a lower amount of light.

FIG. 2B illustrates a path of light emitted from the backlight B when the high refractive layer 12 has a diffraction grating structure.

As illustrated in FIG. 2B, light emitted from the backlight B is diffracted at a diffraction grating portion. Thus, amount of light propagating in wide angle directions may not be reduced. As a result, contrast may be improved in wide angle directions.

Referring to FIG. 1C, the low refractive layer 13 is formed on the high refractive layer 12 and has a lower refractive index than that of the high refractive layer 12. According to an embodiment, a difference between a refractive index of the high refractive layer 12 and a refractive index of the low refractive layer 13 may be, for example, 0.05 or more, 0.07 or more, or 0.1 or more. Due to the difference between the refractive index of the high refractive layer 12 and the low refractive layer 13, more diffraction may occur by the diffraction grating.

The low refractive layer 13 may include a component that erodes the high refractive layer 12. Thus, an interface between the high refractive layer 12 and the low refractive layer 13 may become in a state in which components thereof are compatible with each other.

For example, the component in the low refractive layer 13 eroding the high refractive layer 12 may have a relatively low molecular weight resulting in increased flowability, may have a higher affinity with the high refractive layer 12, and may include a functional group reactive with the high refractive layer 12. This component may be, for example, a monomer having a photo-polymerizable functional group. Examples of the monomer having a photo-polymerizable functional group may include methyl acrylate, ethyl acrylate, butyl acrylate, 2-ethylhexyl acrylate, 2-hydroxyethyl acrylate, methyl methacrylate, ethyl methacrylate, butyl methacrylate, isobutyl methacrylate, 2-hydroxyethyl methacrylate, and glycidyl methacrylate.

The low refractive layer 13 includes a polymer of a monomer having three or more multifunctional polymerizable functional groups. By limiting the polymerizable functional groups to the three or more multifunctional groups, a stronger film may be obtained after polymerization. The polymerizable functional group may be, for example, a photo-polymerizable functional group or a thermal polymerizable functional group.

Examples of the monomer having the three or more multifunctional polymerizable functional groups may include a monomer having a photo-polymerizable functional group such as pentaerythritol tetraacrylate (A-TMMT), dipentaerythritol hexaacrylate, ethoxylated isocyanuric acid triacrylate, trimethylolpropane triacrylate (TMPTA), and pentaerythritol triacrylate (A-TMM-3). A monomer in which a long-chain alkyl group or a polyether group is bonded to a reactive functional group such as an acryl group or a methacryl group may be selected to enhance toughness of a film after polymerization. A monomer in which some or all of reactive functional groups such as an acryl group or a methacryl group are substituted with a long-chain alkyl group or a polyether group may be selected. For example, ethoxylated pentaerythritol tetraacrylate (ATM-35E available from Shin Nakamura Chemical Co., Ltd.) may be used.

According to an embodiment, a high refractive layer-forming coating solution may be applied to the substrate 11 and cured to form the high refractive layer 12. In this process, the monomer eroding a component of the substrate 11 erode the substrate 11. As a result, the interface between the substrate 11 and the high refractive layer 12 may become in a state in which components thereof are compatible with each other.

A low refractive layer-forming coating solution may be applied to the high refractive layer 12 and cured to form the low refractive layer 13. In this process, a component permeating into the high refractive layer 12 erodes the high refractive layer 12. As a result, the interface between the high refractive layer 12 and the low refractive layer 13 becomes a state in which components thereof are compatible with each other.

That is, in the functional film 10 according to an embodiment, the interfaces respectively between the substrate 11 and the high refractive layer 12 and the high refractive layer 12 and the low refractive layer 13 may be in compatible states of components constituting both layers formed on each of the interfaces.

According to an embodiment, contrast may be improved in wide angle directions due to effects by diffracted light based on the diffraction grating structure of the high refractive layer 12. In addition, reflectivity of external light may decrease in compatible portions. That is, although the difference between the refractive index of the high refractive layer 12 and the refractive index of the low refractive layer 13 increases, reflectivity may not considerably increase in the interface between the high refractive layer 12 and the low refractive layer 13 having the diffraction grating structure. Thus, the interface having the diffraction grating structure has an optical function of inhibiting reflection of light even if there is a relatively large difference between the refractive indexes. In addition, the interface between the two layers is a double layer of the high refractive layer 12 and the low refractive layer 13. Also, according to an embodiment, reflectivity of the interface between the substrate 11 and the high refractive layer 12 may further decrease due to the compatible state. According to an embodiment, contrast may be improved and reflectivity may be reduced in a wide angle direction, and contrast or visibility may be improved. Also, the comparative portion may have a thickness of a wavelength of visible light or more or a thickness of about 400 nm to about 2 μm.

Figure 3A:
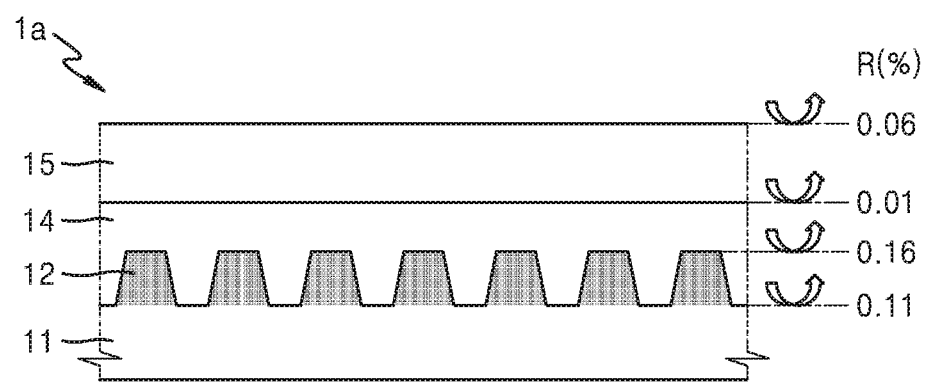
FIGS. 3A and 3B are diagrams for comparing reflectivity of a functional film of the related art having a diffraction grating structure with a functional film having a diffraction grating structure according to an embodiment.
Figure 3B:
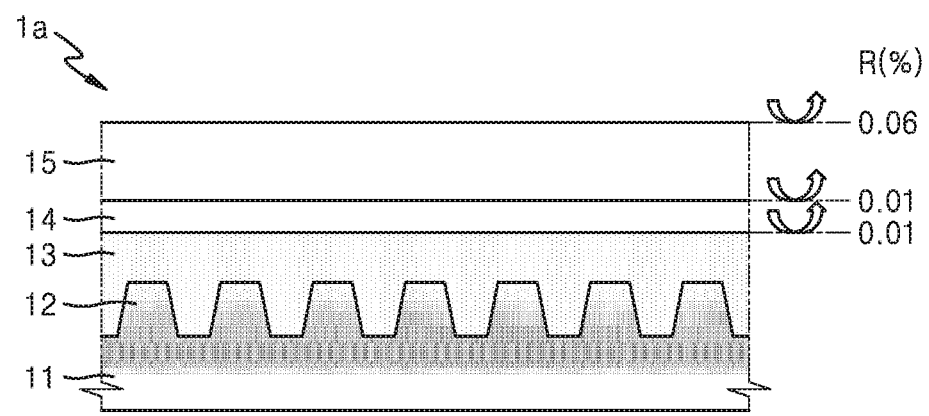

FIGS. 3A and 3B are diagrams for comparing of reflectivity between a conventional functional film having a diffraction grating structure with the functional film 10 having a diffraction grating structure according to an embodiment. In this regard, reflectivity is a reflectivity R of regularly reflected light.

FIG. 3A illustrates reflectivity R of the conventional functional film. FIG. 3B illustrates reflectivity R of the functional film 10 according to an embodiment.

A TAC constituting a substrate 11 has a refractive index of 1.49 and a high refractive layer 12 has a refractive index of 1.59. In addition, a low refractive layer 13 has a refractive index of 1.50 and an adhesive film layer 14 has a refractive index of 1.47. In addition, a substrate film of an anti-reflective layer 15 is formed of TAC, the same material used to form the substrate 11, and has a reflectivity of the outermost surface of 0.06%.

In the conventional functional film illustrated in FIG. 3A, the high refractive layer 12 and the anti-reflective layer 15 are bonded by the adhesive film layer 14, and does not include a low refractive layer 13.

In FIG. 3A, a reflectivity R obtained by reflection on the surface of the anti-reflective layer 15 is 0.06%. In addition, a reflectivity R obtained by reflection on the interface between the anti-reflective layer 15 and the adhesive layer 14 is 0.01%. Also, a reflectivity R obtained by reflection on the interface between the adhesive layer 14 and the high refractive layer 12 is 0.16%. Also, a reflectivity R obtained by reflection on the interface between the high refractive layer 12 and the substrate 11 is 0.11%. As a result, a total reflectivity R is 0.34%.

In the functional film 10 according to an embodiment shown in FIG. 3B, a reflectivity R obtained by reflection on the surface of the anti-reflective layer 15 is 0.06%. In addition, a reflectivity R obtained by reflection on the interface between the anti-reflective layer 15 and the adhesive layer 14 is 0.01%. Also, a reflectivity R obtained by reflection on the interface between the adhesive layer 14 and the low refractive layer 13 is 0.01%. Meanwhile, since the interface between the low refractive layer 13 and the high refractive layer 12 and the interface between the high refractive layer 12 and the substrate 11 are in compatible states, almost no reflection occurs. Thus, the reflectivity R is almost zero. As a result, a total reflectivity R of the functional film 10 according to an embodiment is 0.08%, which is far less than 0.34% of the conventional functional film as shown in FIG. 3A. According to an embodiment the reflectivity R may be 0.3% or less.

Referring to FIG. 1C, the adhesive layer 14 is a functional layer having adhesiveness and exerting an adhesive force between the low refractive layer 13 and the anti-reflective layer 15. Although components of the adhesive layer 14 are not particularly limited, the adhesive layer 14 may include, for example, a main agent and a tackifier dispersed in the main agent.

The tackifier may provide adhesiveness. The tackifier is not particularly limited and may be, for example, a styrene resin, a xylene resin, an aromatic modified terpene resin, a terpene phenol resin, an aliphatic petroleum resin, an aromatic petroleum resin, an aliphatic aromatic petroleum resin, a coumarone-indene resin, a phenol resin, a disproportionated rosin resin, and a rosin modified phenol resin.

The main agent is a binder for holding and dispersing the tackifier. Examples of the main agent include an acrylic pressure-sensitive adhesive or a rubber-based pressure-sensitive adhesive.

Examples of the acrylic pressure-sensitive adhesive may include a polymer obtained by copolymerizing a (meth) acrylic acid ester monomer. Examples of the rubber-based adhesive include natural rubber, styrene butadiene rubber, butyl rubber, isoprene rubber, butadiene rubber, and a styrene-isoprene rubber block copolymer.

The anti-reflective layer 15 is located on the outermost surface of the display screen 1a and suppressing reflection of external light. That is, the anti-reflective layer 15 is the outermost layer. According to an embodiment, the anti-reflective layer 15 is formed on the low refractive layer 13 as illustrated in FIG. 1C. However, embodiments are not limited thereto, and the anti-reflective layer 15 may be formed on the lower surface of the substrate 11 opposite to the high refractive layer 12. That is, the high refractive layer 12, the low refractive layer 13, and the adhesive layer 14 may be formed on one surface of the substrate 11 and the anti-reflective layer 15 may be formed on the opposite surface of the substrate 11.

Figure 4:
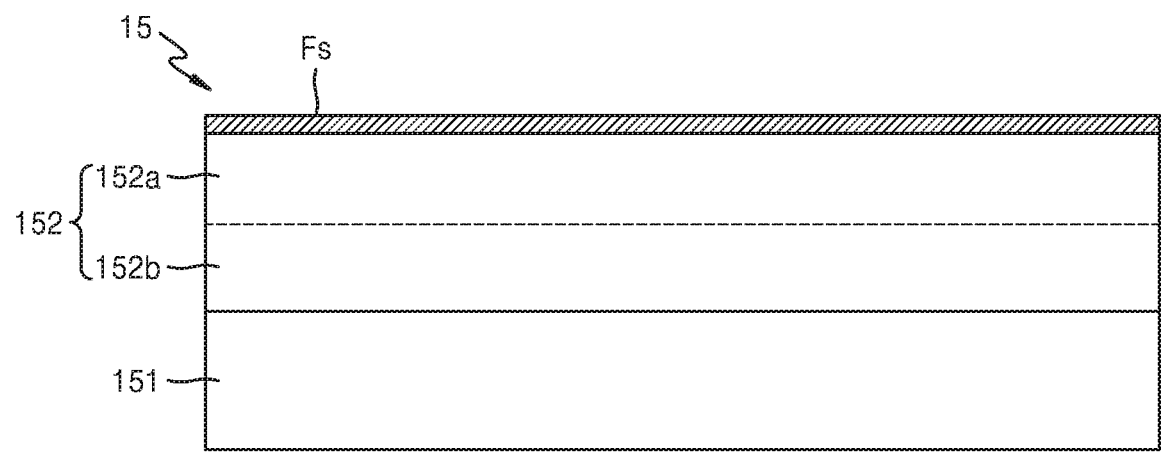
FIG. 4 is a diagram for describing a configuration of an anti-reflective layer.

FIG. 4 is a diagram for describing a configuration of the anti-reflective layer 15.

The anti-reflective layer 15 includes a substrate 151 and an anti-reflective functional layer 152. With this structure, the anti-reflective layer 15 may be an anti-reflective film. In addition, the anti-reflective layer 15 may be adhered to the low refractive layer 13 by the adhesive layer 14.

The substrate 151 may be formed of TAC, PET, or the like as described above. However, embodiments are not limited thereto. The substrate 151 may be a transparent substrate having a total light transmittance of 85% or more, 90% or more, or 95% or more similar to the substrate 11. In addition, the substrate 151 has a thickness of, for example, about 20 μm to about 200 μm similar to the substrate 11.

The anti-reflective functional layer 152 may suppress reflection of external light when external light is irradiated. In addition, the anti-reflective functional layer 152 may reduce or prevent the functional film 10 from being scratched.

In the case of the example shown in FIG. 4, the anti-reflective functional layer 152 includes an ultra-low refractive layer 152a and a hard coat layer 152b.

The ultra-low refractive layer 152a may include a binder, hollow silica particles, and a photopolymerization product of a one-end reactive photo-polymerizable fluorine-containing polymer, and a modified silicone. The ultra-low refractive layer 152a may have a thickness of about 80 nm to about 120 nm to obtain sufficient anti-reflective functions against coherent light.

The ultra-low refractive layer 152a may have a structure in which hollow silica particles are distributed in a binder including a resin as a main component.

The hollow silica particles may have a shell layer and the inside of the shell layer may be hollow or porous. The shell layer and the porous body may be mainly formed of silicon dioxide (SiO2). Also, a plurality of photo-polymerizable functional groups and hydroxyl groups are bonded to the surface of the shell layer. By including hollow silica particles, the ultra-low refractive layer 152a may have a relatively low refractive index, thereby reducing or preventing reflection of external light.

The binder may have a network structure and connect the hollow silica particles. The binder includes a photo-curable fluorine-containing resin. The photo-curable fluorine-containing resin is a photopolymerization product of a mixture of a side-chain reactive photo-polymerizable fluorine polymer and a siloxane compound.

The side-chain reactive photo-polymerizable fluorine polymer has a structure represented by Formulas (1) and (2) below. In addition, when the total amount of the side-chain reactive photo-polymerizable fluorine polymer is regarded as 100 mol %, an amount of the structural unit M is from 0.1 mol % or more to 100 mol % or less. In addition, an amount of the structural unit A is greater than 0 mol % to 99.9 mol % or less. In addition, a number average molecular weight is from about 30,000 Dalton to about 1,000,000 Dalton.

Formulas (1) and (2)

(1)

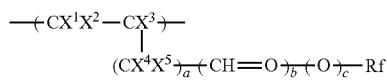
(2)

In Formula (1), the structural unit M is a structural unit derived from a fluorine-containing ethylenic monomer represented by Formula (2). In addition, the structural unit A is a structural unit copolymerizable with the fluorine-containing ethylenic monomer represented by Formula (2).

In Formula (2), $X^1$ is H or F, $X^2$ is H or F. $X^3$ is H, F, $CH_3$, or $CF_3$. $X^4$ is H, F, or $CF_3$, and $X^5$ is H, F, or $CF_3$. Rf is an organic group in which one to three Y's are bonded to a fluorine-containing alkyl group. In addition, $Y^1$ is a monovalent organic group having 2 to 10 carbon atoms and an ethylenic carbon-carbon double bond at one end thereof. The fluorine-containing alkyl group includes a fluorine-containing alkyl group including 1 to 40 carbon atoms or an ether bond having 2 to 100 carbon atoms. In addition, a is 0, 1, 2 or 3, and b and c are 0 or 1.

The side-chain reactive photo-polymerizable fluorine polymer shown in Formulas (1) and (2) above may be, for example, OPTOOL AR-110 available from Daikin Industries, Ltd.

The siloxane compound is, for example, a silicon-containing compound. The silicon-containing compound according to an embodiment has a main chain formed by a siloxane bond and includes at least one photo-polymerizable functional group and at least one alkoxy group.

Particularly, the silicon-containing compound may be represented by Formula (3) below.

Formula (3)

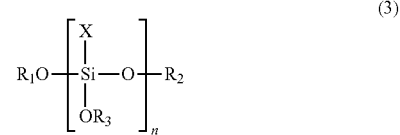
(3)

In Formula (3), $R_1$ to $R_3$ are each independently a straight or branched C1-C10 alkyl group. In addition, X includes at least one selected from a photoreactive group, an alkyl group, a phenyl group, an amino group, an isocyanate group, a vinyl group, a mercapto group, and a glycidoxy group. Here, X includes two or more photoreactive groups. In addition, n is an integer from 1 to 20. $R_1$ to $R_3$ are the same alkyl group or different from each other. The silicon-containing compound according to embodiment may include, for example, a plurality of types of the silicon-containing corn pound represented by Formula (3).

Here, $R_1$ to $R_3$ are, for example, a methyl group or an ethyl group. In addition, X is, for example, an acryloyl group or a methacryloyl group. In addition, n is, for example, an integer from 2 to 10.

In addition, the ultra-low refractive layer 152a has a fluoropolymer layer Fs formed on the upper surface.

The fluoropolymer layer Fs includes a fluoropolymer. The fluoropolymer is obtained by photo-polymerization of a one-end reactive photo-polymerizable fluoropolymer represented by Formula (4) below. The fluoropolymer is an additive imparting an antifouling property and a slippery property to the ultra-low refractive layer 152a.

Formula (4)

(4)

In Formula (4), $Rf^1$ is a (per)fluoroalkyl group or a (per)fluoro polyether group. $W^1$ is a linking group, $RA^1$ is a functional group having a polymerizable unsaturated group, n is an integer from 1 to 3, and m is an integer from 1 to 3. In addition, $RA^1$ at an end serves as a photo-polymerizable functional group.

The fluoropolymer layer Fs may include a modified silicone. The modified silicone has a higher molecular weight and is incompatible with the binder. Thus, the modified silicone bleeds out together with the one-end reactive photo-polymerizable fluoropolymer, thereby being localized on the surface of the ultra-low refractive layer

152a. That is, the modified silicone is mainly distributed on the surface of the ultra-low refractive layer 152a.

In this regard, the modified silicone according to an embodiment is obtained by substituting a methyl group of a straight dimethyl polysiloxane represented by Formula (5) below with another organic group. In addition, no is an integer of 1 or greater. For example, no is an integer from 1 to 1000. That is, the modified silicone is, for example, an organic modified straight dimethyl polysiloxane.

Formula (5)

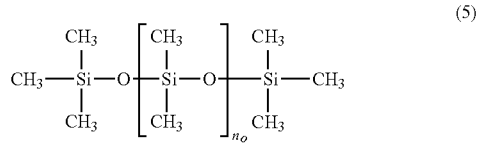

For example, the hard coat layer 152b is formed by applying a solution including a monomer and photo-polymerizing the monomer. Examples of the monomer may include pentaerythritol tetraacrylate (A-TMMT), dipentaerythrito hexaacrylate, ethoxylated isocyanuric acid triacrylate, trimethylolpropane triacrylate (TMPTA), and pentaerythritol triacrylate (A-TMM-3).

A monomer having a high refractive index may be selected to further improve the anti-reflection property. In addition, the refractive index may be adjusted by adding metal or metal oxide particles having a high refractive index and a diameter less than 100 nm. An antistatic agent, an antifouling agent, or a monomer having a high degree of cross-linking or a high cohesion for improvement of hardness may also be used to increase the value of displays. The hard coat layer 152b may have a thickness of, for example, about 1 μm to about 20 μm to obtain strength, but the thickness is not limited thereto.

Also, although FIGS. 1A to 1C illustrate that the functional film 10 is mounted on the liquid crystal panel E of the display device 1, the embodiment is not limited thereto. For example, the functional film 10 may be installed in an organic electroluminescent (EL) display or a cathode ray tube (CRT). Also, the installation of the functional film 10 is not limited to the display device 1 and the functional film 10 may also be mounted on a surface such as a lens. Also, in this case, the substrate 11 is a body of the lens formed of glass or plastic and the lens on which the functional film 10 is mounted is an optical member.

In FIG. 1C, the high refractive layer 12 is formed on the substrate 11 and has a higher refractive index than that of the substrate 11. The high refractive layer 12 may be regarded as a layer having a higher refractive index than that of an object on which the high refractive layer 12 is mounted. That is, when the high refractive layer 12 is mounted on a polarizer such as the polarizing film D, the high refractive layer 12 may have a higher refractive index than that of the polarizing film D. In addition, when the high refractive layer 12 is mounted on a display such as the liquid crystal panel E, the high refractive layer 12 has a higher refractive index than that of the surface of the liquid crystal panel E.

Although FIG. 1C illustrates the anti-reflective layer 15, the anti-reflective layer 15 may not be included.

Although FIG. 4 illustrates that the anti-reflective layer 15 includes the substrate 151 and the anti-reflective functional layer 152, the substrate 151 may not be included. That is, the anti-reflective functional layer 152 may be used alone.

Although FIG. 1C illustrates the adhesive layer 14 used to adhere the anti-reflective layer 15 to the low refractive layer 13. However, when the anti-reflective functional layer 152 is directly provided on the low refractive layer 13 without bonding, the adhesive layer 14 may not be included.

In the functional film 10 shown in FIG. 1C, the substrate 11, the high refractive layer 12, and the low refractive layer 13 are sequentially stacked and the anti-reflective layer 15 is stacked thereon as an outermost layer, however, the order of stacking the layers is not limited thereto.

FIGS. 7A to 7E are views illustrating other examples of the stacking order of the layers of the functional film 10. Also, in this case, the adhesive layer 14 is may not be included.

FIG. 7A illustrates an example where the order of stacking the high refractive layer 12 and the low refractive layer 13 is reversed in the functional film 10 of FIG. 1C. That is, the substrate 11, the low refractive layer 13, the high refractive layer 12, the adhesive layer 14, and the anti-reflective layer 15 are sequentially stacked toward the anti-reflective layer 15 as the outermost layer. In this example, an interface between the substrate 11 and the low refractive layer 13 is in a state where components thereof are compatible with each other. Also, an interface between the low refractive layer 13 and the high refractive layer 12 is in a state where components thereof are compatible with each other.

Figure 7B:
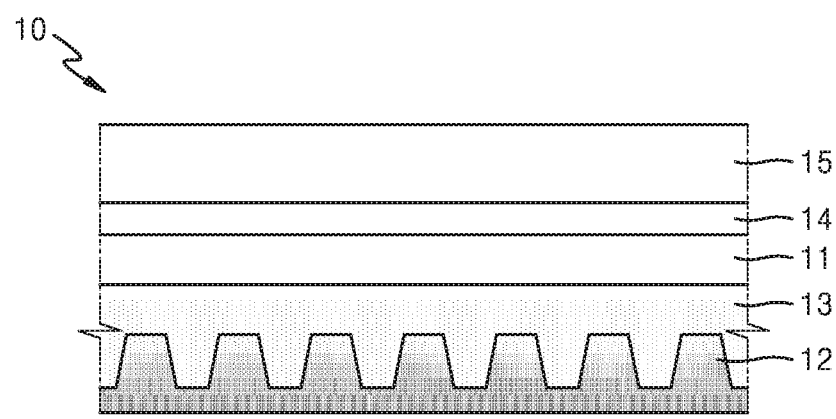
Figure 7C:
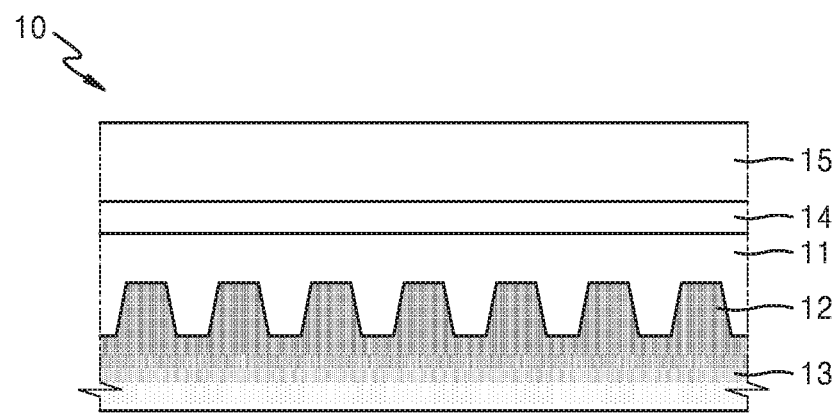

FIGS. 7B and 7C are views illustrating the high refractive layer 12 and the low refractive layer 13 being mounted on the opposite surface of the substrate 11 in the functional film 10 of FIG. 1C.

In this case, the adhesive layer 14 and the anti-reflective layer 15 are mounted on the substrate 11 on one side of the substrate, being the same side as the functional film 10 of FIG. 1C. However, the high refractive layer 12 and the low refractive layer 13 are mounted on the opposite surface to the anti-reflective layer 15 with the substrate 11 interposed therebetween.

FIG. 7B illustrates an example where the high refractive layer 12, the low refractive layer 13, the substrate 11, the adhesive layer 14, and the anti-reflective layer 15 are sequentially stacked toward the anti-reflective layer 15 that is the outermost layer. In this case, an interface between the high refractive layer 12 and the low refractive layer 13 is in a state where components thereof are compatible with each other. Also, an interface between the low refractive layer 13 and the substrate 11 is in a state where components thereof are compatible with each other.

FIG. 7C illustrates an example where the low refractive layer 13, the high refractive layer 12, the substrate 11, the adhesive layer 14, and the anti-reflective layer 15 are sequentially stacked toward the anti-reflective layer 15 that is the outermost layer. In this case, an interface between the low refractive layer 13 and the high refractive layer 12 is in a state where components thereof are compatible with each other. Also, an interface between the high refractive layer 12 and the substrate 11 is in a state where components thereof are compatible with each other.

Figure 7D:
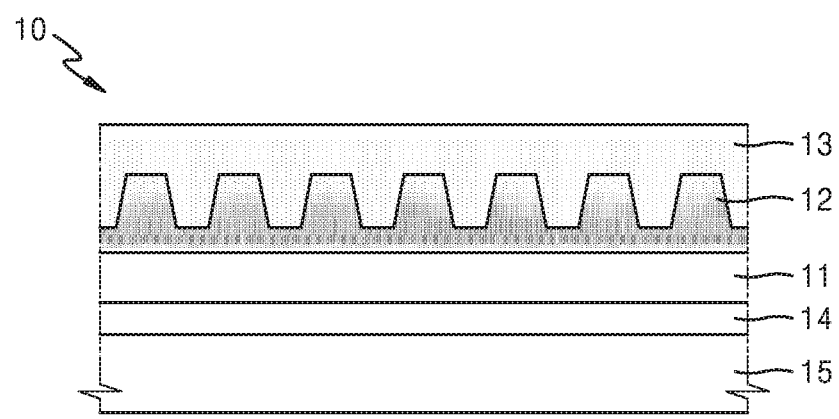
Figure 7E:
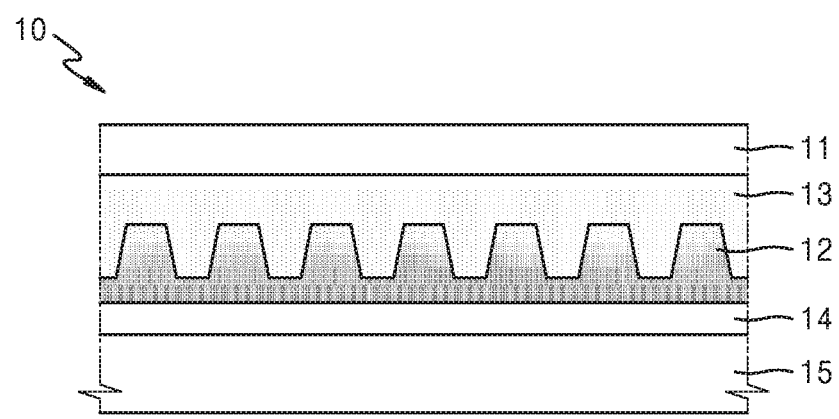

FIGS. 7D and 7E illustrate examples where the anti-reflective layer 15 is not mounted on the outermost layer. FIG. 7D illustrates that the high refractive layer 12 and the low refractive layer 13 are stacked on the substrate 11 in the same manner as in the functional film 10 of FIG. 1C. However, the adhesive layer 14 and the anti-reflective layer 15 are mounted on the opposite side to the high refractive layer 12 and the low refractive layer 13 with the substrate 11 interposed therebetween. In this case, the outermost layer is the low refractive layer 13. In addition, the anti-reflective layer 15, the adhesive layer 14, the substrate 11, the high refractive layer 12, and the low refractive layer 13 are sequentially stacked toward the low refractive layer 13 that is the outermost layer. In this case, an interface between the substrate 11 and the high refractive layer 12 is in a state where components thereof are compatible with each other. Also, an interface between the high refractive layer 12 and the low refractive layer 13 is in a state where components thereof are compatible with each other.

FIG. 7E illustrates that all of the high refractive layer 12, the low refractive layer 13, the adhesive layer 14, and the anti-reflective layer 15 are stacked on the opposite surface of the substrate 11. In this case, the substrate 11 is the outermost layer and the anti-reflective layer 15, the adhesive layer 14, the high refractive layer 12, the low refractive layer 13, and the substrate 11 are sequentially stacked toward the substrate 11 that is the outermost layer. In this case, an interface between the high refractive layer 12 and the low refractive layer 13 is in a state where components thereof are compatible with each other. Also, an interface between the low refractive layer 13 and the substrate 11 is in a state where components thereof are compatible with each other.

The configurations of FIGS. 7D and 7E are effective particularly for a case where an air layer is formed on the opposite surface of the substrate 11.

Description of Method of Manufacturing Functional Film 10

Figure 5:
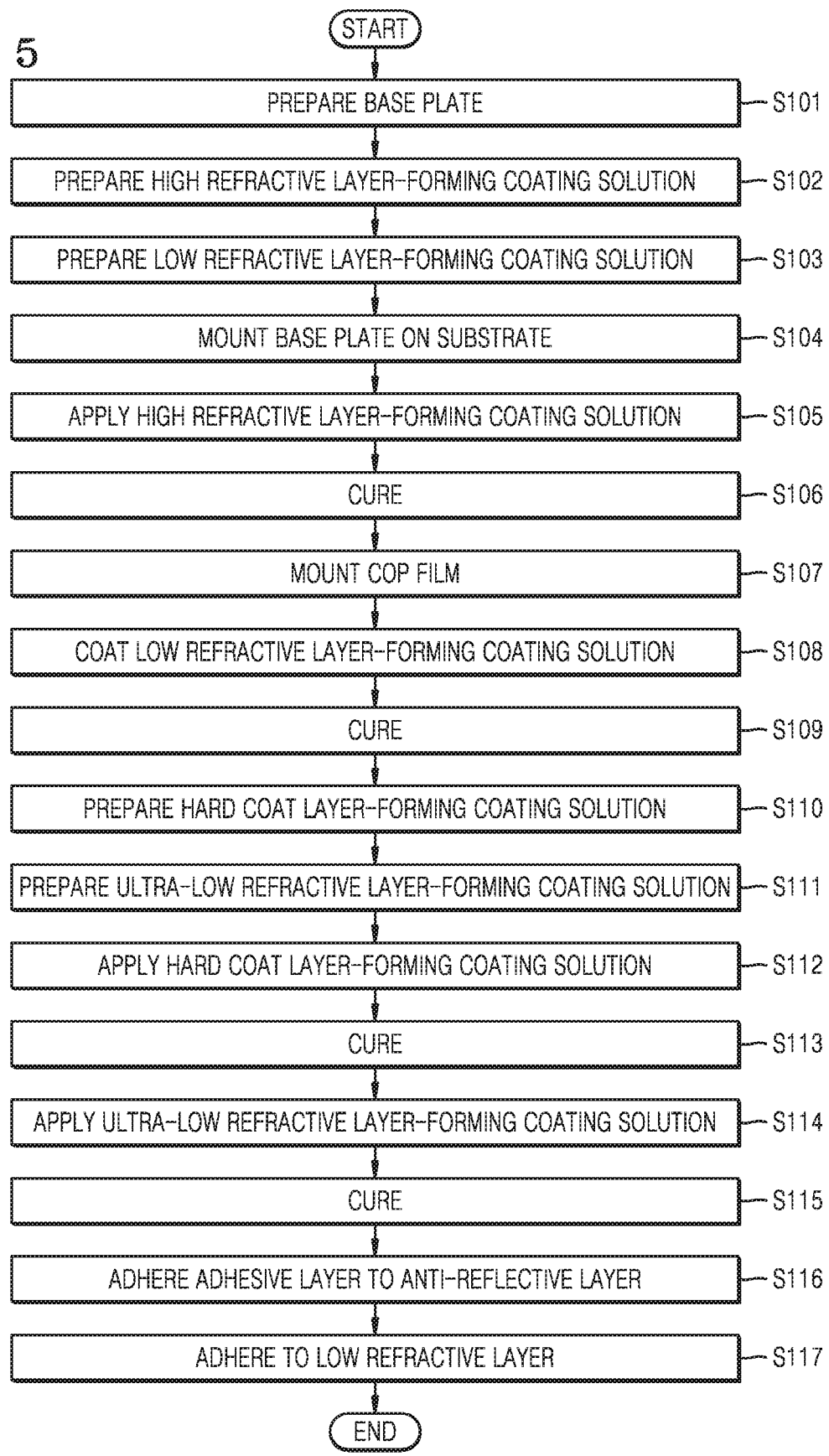
FIG. 5 is a flowchart for describing an example method of manufacturing a functional film according to an embodiment.

FIG. 5 is a flowchart for describing a method of manufacturing the functional film 10 according to an embodiment.

First, a base plate to form a diffraction grating structure of the high refractive layer 12 is prepared (S101). For example, the base plate is manufactured according to the following process.

A dry film photoresist (DFR) is adhered to a PET film and laminated by a lamination device. In addition, a mask having a diffraction grating pattern is placed thereon and UV exposure is performed. The resultant is immersed in an alkali solution and unexposed portions are etched. Next, the resultant is washed with water and dried. Thus, a base plate having a diffraction grating pattern to form the diffraction grating structure is prepared.

Next, a first coating solution for forming the high refractive layer 12 (high refractive layer-forming coating solution) is prepared (S102). The coating solution includes a monomer eroding TAC that is a component of the substrate 11 and a monomer having one or two polymerizable functional groups.

Also, the coating solution includes a solvent with a relatively high affinity with the two types of monomers as needed for viscosity adjustment, and the like. The solvent may select whether to erode TAC constituting the substrate 11. Thus, the compatible state of the components of the substrate 11 and the high refractive layer 12 may be adjusted in the interface therebetween.

Examples of the solvent may include, but are not limited to, methyl ethyl ketone (MEK), methyl acetate, dimethyl carbonate, and 1,3-dioxolane and any solvent with a high affinity with the two types of monomers may also be used.

In addition, according to an embodiment, the two types of monomers are polymerized and cured. As described below, photo-polymerization via UV exposure is performed. To this end, the coating solution further includes a photo-polymerization initiator. Examples of the photo-polymerization initiator may include, but are not limited to, an acylphosphine oxide-based photo-polymerization initiator. The photo-polymerization initiator may be, for example, IRGACURE TPO available from BASF Japan Ltd.

In the case where thermal polymerization is used, the photo-polymerization initiator is not required.

The two types of monomers, the photo-polymerization initiator, and the solvent are mixed to prepare the high refractive layer-forming coating solution.

In addition, a second coating solution for forming the low refractive layer 13 (low refractive layer-forming coating solution) is prepared (S103). The coating solution includes a component that erodes the high refractive layer 12 and a monomer having a polymerizable functional group. In addition, according to an embodiment, the coating solution includes a photo-polymerization initiator in the same manner as in the afore-mentioned high refractive layer-forming coating solution. The same photo-polymerization initiator described above may be used. The component that erodes the high refractive layer 12, the monomer having a polymerizable functional group, and the photo-polymerization initiator are mixed to prepare the low refractive layer-forming coating solution.

In addition, a film formed of TAC is prepared as the substrate 11. Then, the base plate is mounted on the substrate 11 (S104).

Next, the high refractive layer-forming coating solution (first coating solution) is poured between the substrate 11 and the base plate (S105). At this time, a laminator is used to prevent air bubbles from being formed therein and simultaneously increasing adhesion of the coating layer to the substrate 11.

Then, the resultant is exposed to UV light and the coating solution (first costing solution) is cured (S106). When the base plate is separated therefrom, a high refractive layer 12 having a diffraction grating structure is formed on the substrate 11.

Next, a cyclo olefin polymer (COP) film, as a releasing film, is mounted on the high refractive layer 12 (S107).

Then, the low refractive layer-forming coating solution (second coating solution) is poured between the high refractive layer 12 and the COP film (S108). At this time, a laminator is used to prevent air bubbles from being formed therein and simultaneously increasing adhesion of the coating layer to the high refractive layer 12.

Then, the resultant is exposed to UV light and the coating solution (second costing solution) is cured (S109). When the COP film is separated therefrom, a low refractive layer 13 is formed on the high refractive layer 12.

The anti-reflective layer 15 is prepared according to the following method.

First, a third coating solution for forming the hard coat layer 152b (hard coat layer-forming coating solution) is prepared (S110). The coating solution is obtained by dispersing a monomer such as pentaerythritol tetra acrylate (A-TMMT) and a photo-polymerization initiator in a solvent. For example, a mixture of diacetone alcohol and 1,3-dioxolane is used as the solvent. As the photo-polymerization initiator, for example, α-hydroxyacetophenone-based photo-polymerization initiator is used. The photo-polymerization initiator may be, for example, IRGACURE184 available from BASF Japan Ltd.

Next, a fourth coating solution for forming the ultra-low refractive layer 152a (ultra-low refractive layer-forming coating solution) is prepared (S111). The coating solution includes hollow silica particles and a side-chain reactive photo-polymerizable fluorine polymer. The coating solution further includes a siloxane compound and a modified silicone. The coating solution further includes a photo-polymerization initiator. The coating solution further includes a one-end reactive photo-polymerizable fluoropolymer as an additive. These compounds are added to a solvent and the mixture is stirred to prepare the coating solution. For example, methyl ethyl ketone (MEK) is used as the solvent. As the photo-polymerization initiator, for example, α-hydroxyacetophenone-based photo-polymerization initiator is used. The photo-polymerization initiator may be, for example, IRGACURE907 available from BASF Japan Ltd.

Next, the hard coat layer-forming coating solution (third coating solution) is applied to the substrate 151 (S112). A method of applying the anti-reflective layer-forming coating solution to the substrate 151 is not particularly limited and any known method such as a die coating method may be used.

Then, the resultant is exposed to UV light and the third coating solution is cured (S113). As a result, a hard coat layer 152b is formed.

Next, an ultra-low refractive layer-forming coating solution (fourth coating solution) is applied to the hard coat layer 152b (S114). A method of applying the ultra-low refractive layer-forming coating solution to the hard coat layer 152b is not particularly limited and any known method such as a die coating method may be used.

Then, the resultant is exposed to UV light and the fourth coating solution is cured (S115). As a result, an ultra-low refractive layer 152a is formed.

Thus, the anti-reflective layer 15 is formed. Accordingly, S112 to S115 are anti-reflective layer forming processes to form the anti-reflective layer 15.

Next, the prepared anti-reflective layer 15 is adhered to the low refractive layer 13 according to the following method.

First, the adhesive layer 14 is adhered to the substrate 151 of the anti-reflective layer 15 (S116).

Next, the anti-reflective layer 15 to which the adhesive layer 14 is adhered is further adhered to the low refractive layer 13 (S117). Thus, a functional film 10 is prepared.

Example of preparing a functional film 10 includes preparing a diffraction grating pattern having a groove shape with a line width of 6 μm and a pitch of 14 μm as a diffraction grating structure of the high refractive layer 12.

A base plate may be prepared according to the following process. First, a DFR may be adhered to a PET film and laminated by using a lamination device. Lumirror FB50 (having a thickness of 16 μm) available from Toray Industries, Inc. may be used as the DFR. In addition, a mask having the diffraction pattern is placed thereon and UV exposure may be performed. The resultant may be immersed in 1% by weight of an NaOH solution that is an alkali solution and unexposed portions were etched. Next, the resultant may be washed with water and dried at 60° C. for 30 minutes to prepare the base plate.

Next, a coating solution for forming the high refractive layer 12 (high refractive layer-forming coating solution, first coating solution) may be prepared using ACMO available from KJ Chemicals Corporation as a TAC eroding monomer. ACMO includes an amino group, as a functional group, eroding TAC. In addition, A-LEN-10 available from Shin Nakamura Chemical Co., Ltd. may be prepared as a monomer having one or two polymerizable functional groups. This may be a monofunctional acrylate monomer having one photo-polymerizable functional group. Also, OGSOL EA-0200 available from Osaka Gas Chemicals Co., Ltd. may be prepared as a monomer having one or two polymerizable functional groups. This is a bifunctional acrylate monomer having two photo-polymerizable functional groups. Also, IRGACURE TPO available from BASF Japan Ltd. may be prepared as a photo-polymerization initiator. This may be 2, 4, 6-trimethylbenzoyl-diphenyl-phosphine oxide. In addition, 1,3-dioxolane may be used as a solvent. These components may be mixed in a weight ratio of 45:10:45:0.5:5. Thus, the high refractive layer-forming coating solution (first coating solution) may be prepared.

Next, a coating solution for forming the low refractive layer 13 (low refractive layer-forming coating solution, second coating solution) may be prepared. To this end, GMA available from Mitsubishi Chemical Corporation may be prepared as a component eroding the high refractive layer 12. GMA that stands for glycidyl methacrylate permeates into the high refractive layer 12. Also, A-DPH available from Shin Nakamura Chemical Co., Ltd. may be prepared as a monomer having a polymerizable functional group. A-DPH that stands for dipentaerythritol acrylate is a multifunctional acrylate monomer. Also, ATM-35 E available from Shin Nakamura Chemical Co., Ltd. may be prepared as a monomer having a polymerizable functional group. ATM-35 E that stands for ethoxylated pentaerythritol tetra acrylate is a multifunctional acrylate monomer. IRGACURE TPO available from BASF Japan Ltd. may be used as a photo-polymerization initiator. These components may be mixed in a weight ratio of 35:20:45:1. Thus, a low refractive layer-forming coating solution (second coating solution) may be prepared.

A TAC film may be prepared as the substrate 11 and the base plate may be mounted on the substrate 11. The high refractive layer-forming coating solution (first coating solution) may be poured between the substrate 11 and the base plate and the structure may be passed through a laminator. The resultant may be exposed to UV light, the coating solution (first coating solution) may be cured, and the base plate may be removed therefrom. Thus, the high refractive layer 12 having a diffraction grating structure may be formed on the substrate 11.

Next, a cyclo olefin polymer (COP) film may be mounted on the high refractive layer 12. The low refractive layer-forming coating solution (second coating solution) may be poured between the high refractive layer 12 and the COP film and the structure may be passed through the laminator. The resultant may be exposed to UV light, the coating solution (second coating solution) may be cured, and the COP film may be removed therefrom. Thus, the low refractive layer 13 may be formed on the high refractive layer 12.

Next, a coating solution for forming the hard coat layer 152b (hard coat layer-forming coating solution, third coating solution) may be prepared.

Pentaerythritol tetra acrylate (A-TMMT) available from Shin Nakamura Chemical Co., Ltd. may be prepared as a monomer. Also, pentaerythritol triacrylate (A-TMM-3) may be prepared as another monomer. The monomers may be prepared in a weight ratio of 1:1. Diacetone alcohol and 1,3-dioxolane may be prepared as solvents. The solvents may be mixed in a weight ratio of 40:60 and the mixed solvent may be mixed with the two monomers. IRGACURE 184 available from BASF Japan Ltd. may be added thereto as a photo-polymerization initiator. Thus, the hard coat layer-forming coating solution (third coating solution) may be prepared. As solid contents, the content of two monomers may be 96% by weight and the content of the photo-polymerization initiator may be 4% by weight. The solid content in the hard coat layer-forming coating solution may be 35% by weight.

Also, a coating solution for forming the ultra-low refractive layer 152a of the anti-reflective layer 15 (ultra-low refractive layer-forming coating solution, fourth coating solution) may be prepared.

Two types of hollow silica particles may be prepared. That is, Surulia 4320 hollow silica particles (median particle diameter: 60 nm) available from Nikki Shokubai Kasei Co., Ltd. may be prepared. Also, Surulia 5320 hollow silica particles (media particle diameter: 75 nm) available from Nikki Shokubai Kasei Co., Ltd. may be prepared. As active ingredients, 2.5 parts by mass of the former and 60.5 parts by mass of the latter may be used. 28 parts by mass of OPTOOL AR-110 available from Daikin Industries, Ltd. may be used as a side-chain reactive photo-polymerizable fluorine polymer. Also, 5 parts by mass of KR-513 that is a silicon-containing compound available from Shin-Etsu Chemical Co., Ltd. may be used as a siloxane compound. In addition, 1 part by mass of Tego rad 2700 available from Evonik Degussa Japan may be used as a modified silicone. Also, 3 parts by mass of IRGACURE907 available from BASF Japan Ltd. may be used as a photo-polymerization initiator. These compounds may be used as main components and a total content thereof may be regarded as 100 parts by mass.

5 parts by mass of KY-1203 available from Shin-Etsu Chemical Co., Ltd. may be used as a one-end reactive photo-polymerizable fluoropolymer of an additive.

These compounds may be dispersed in a solvent of methyl ethyl ketone (MEK). An amount of a main component other than the one-end reactive photo-polymerizable fluoropolymer and photo-polymerization initiator may be adjusted to 1.5% by weight. Thus, the ultra-low refractive layer-forming coating solution (fourth coating solution) may be prepared.

The hard coat layer-forming coating solution (third coating solution) may be applied to the substrate 151 formed of TAC by using a wire bar to form a coating layer. The coating layer may be maintained at room temperature for 1 minute and dried by heating at 100° C. for 1 minute. Then, the coating layer may be exposed to a UV lamp (metal halide lamp, amount of light: 1000 mJ/cm$^2$) for 5 seconds. Accordingly, the coating layer may be cured. As a result, the hard coat layer 152b may be formed.

Also, the ultra-low refractive layer-forming coating solution (fourth coating solution) v applied to the hard coat layer 152b by using a wire bar to form a coating layer. The coating layer may be maintained at room temperature for 1 minute and dried by heating at 100° C. for 1 minute. Then, the coating layer may be exposed to a UV lamp (metal halide lamp, amount of light: 1000 mJ/cm$^2$) for 5 seconds in a nitrogen atmosphere (oxygen concentration: 500 ppm or less). Accordingly, the coating layer may be cured. As a result, the ultra-low refractive layer 152a may be formed.

As described above, the anti-reflective layer 15 may be prepared.

Next, the adhesive layer 14 may be adhered to the substrate 151 of the anti-reflective layer 15. Then, the anti-reflective layer 15 to which the adhesive layer 14 may be adhered further adhered to the low refractive layer 13.

According to the above-described process, the functional film 10 may be prepared.

According to a related example 1, the high refractive layer 12, the low refractive layer 13, the adhesive layer 14, and the anti-reflective layer 15 are not formed on the substrate 11. That is, only the substrate 11 is formed. In an example of FIG. 1B, only the liquid crystal panel E is formed without having the functional layer H.

According to a related example 2, OGSOL EA-200 is used as a material forming the high refractive layer 12. Also, pentaerythritol tetra acrylate (available from Shin Nakamura Chemical Co., Ltd., A-TMMT) is prepared. Also, IRGACURE TPO is prepared as a photo-polymerization initiator. These components are mixed in a weight ratio of 65:35:0.5. Also, dipentaerythritol hexaacrylate (available from Shin Nakamura Chemical Co., Ltd., A-DPH) is prepared as a material used to form the low refractive layer 13. IRGACURE TPO is also prepared as a photo-polymerization initiator. These compounds are mixed in a weight ratio of 100:1. Then, the functional film 10 is prepared in the same manner as an embodiment and evaluated. As a result, components of the respective layers did not form a compatible state on the contrary to the embodiment (i.e., incompatible).

Front luminance maintenance rates, front contrast maintenance rates, 45° contrast maintenance rates, reflectivity (Specular Components Include (SCI)), poor appearance (moire and rainbow unevenness) of the functional films may be evaluated.

A white image may be displayed on the liquid crystal panel E including the functional film. Luminance in a normal direction of the surface of the functional film (front direction) may be measured by using a conoscope.

In this regard, a luminance of the substrate 11 according to related example 1 is set to 100%, a luminance rate relative thereto may be evaluated as a front luminance maintenance rate. A greater front luminance maintenance rate indicates a higher degree of front luminance maintenance may be achieved.

A white image and a black image respectively having tone values of 100% and 0% may be displayed on the liquid crystal panel E including the functional film. Luminance in a normal direction of the surface of the functional film (front direction) may be measured using a conoscope.

Then, luminance at 100%/luminance at 0% may be calculated and regarded as a front contrast maintenance rate. A greater front contrast maintenance rate indicates a greater contrast in the front direction.

White images (grey images) respectively having tone values of 80% and 20% may be displayed on the liquid crystal panel E including the functional film. Then, luminance in a 45° tilt direction (in a wide angle direction) with respect to the surface of the functional film may be measured using a conoscope.

Then, luminance at 80%/luminance at 20% may be calculated and regarded as a 45° contrast maintenance rate. A greater 45° contrast maintenance rate indicates a high contrast in a wide angle.

A surface (back surface) of the substrate 11 where the high refractive layer 12, the low refractive layer 13, the adhesive layer 14, and the anti-reflective layer 15 are not formed may be covered with a black ink. Then, reflectivity (SCI) may be measured by using a CM-2600d spectrometer available from Konica Minolta Col, Ltd. In this case, measurement conditions include a measurement diameter of 8 mm, a viewing angle of 2°, and a light source corresponding to D65. A lower reflectivity (SCI) indicates lower reflection.

A white image may be displayed on the liquid crystal panel E including the functional film. Defects such as moire or rainbow unevenness may be evaluated by visual observation.

FIG. 6 illustrates an evaluation of comparison of front luminance maintenance rates between Example 1 and Related Example 1. The front luminance maintenance rate of Example 1 may be 96% of that of Related Example 1. Also, upon comparison between Related Examples 1 and 2, the front luminance maintenance rate of Related Example 2 may be 89% of that of Related Example 1, indicating a poorer result than that of Example 1.

Upon comparison of front contrast maintenance rates between Example 1 and Related Example 1, the front contrast maintenance rate of Example 1 may be 86% of that of Related Example 1 may be. Also, upon comparison between the Comparative Examples 1 and 2, the front contrast maintenance rate of Related Example 2 may be 76% of that of Related Example 1, indicating a poorer result than that of Example 1.

45° contrast maintenance rates may be compared between Example 1 and Related Example 1. While a 45° contrast maintenance rate of Related Example 1 may be 30%, a 45° contrast maintenance rate of Example 1 may be 38% which indicates a better result than that of Related Example 1. In addition, a 45° contrast maintenance rate of Related Example 2 may be 38% the same as that of Example 1. That is, the same result may be obtained since the same diffraction grating structure is used in Example 1 and Related Example 2.

The reflectivity (SCI) may be compared between Example 1 and Related Example 1. While the reflectivity of Related Example 1 may be 4.10%, the reflectivity of Example 1 may be 0.23% which indicates a better result than that of Related Example 1. Also, the reflectivity (SCI) may be compared between Example 1 and Related Example 2. While the reflectivity of Related Example 2 may be 0.52%, the reflectivity of Example 1 may be 0.23% which indicates a better result than that of Related Example 2.

Based on the obtained front luminance maintenance rates, higher luminance may be maintained in the front direction according to Example 1. Also, based on the obtained front contrast maintenance rates, higher contrast may be maintained in the front direction according to Example 1.

Also, based on the obtained 45° contrast maintenance rates, higher contrast may be obtained in a wide angle according to Example 1.

Based on the obtained reflectivity (SCI), reflectivity according to Example 1 may be the lowest.

Ta high contrast may be obtained with a low reflectivity in a wide angle according to Example 1.

Poor appearance (moire and rainbow unevenness) may be observed in Related Example 2. It is considered that this result may be obtained since the components do not form a compatible state although the diffraction grating structure is installed. Thus, according to Example 1 and Related Example 1, poor appearance (moire and rainbow unevenness) may not be observed. It is considered that poor appearance may not be observed since the interface between the two layers is in a compatible state.

As described above, according to the one or more of the above exemplary embodiments, an optical member, a polarization member, and a display device having improved contrast and visibility with no or little reflection of light in an interface between two layers having a diffraction grating structure even with a relatively large difference between the refractive indexes may be provided.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical member comprising:
   a substrate; and
   a functional layer provided on the substrate, the functional layer comprising a high refractive layer and a low refractive layer,
   wherein a refractive index of the high refractive layer is higher than a refractive index of the substrate, and the high refractive layer has a diffraction grating structure provided at a second interface between the high refractive layer and the low refractive layer,
   wherein a refractive index of the low refractive layer is lower than the refractive index of the high refractive layer,
   wherein a first interface between the substrate and the high refractive layer is in a state in which components of the substrate and the high refractive layer are compatible with each other,
   wherein the second interface between the high refractive layer and the low refractive layer is in a state in which components of the high refractive layer and the low refractive layer are compatible with each other, and
   wherein the high refractive layer comprises a polymerization product of a monomer configured to be mixed with a component of the substrate.

2. The optical member of claim 1, wherein the substrate, the high refractive layer, and the low refractive layer are sequentially stacked.

3. The optical member of claim 1, wherein the monomer comprises at least one functional group selected from a morpholino group and an amide group.

4. The optical member of claim 1, wherein the high refractive layer comprises the polymerization product of the monomer comprising one or two polymerizable functional groups.

5. The optical member of claim 1, wherein the low refractive layer comprises a component configured to be mixed with the high refractive layer.

6. The optical member of claim 5, wherein the low refractive layer comprises a polymer of a monomer comprising three or more polymerizable functional groups.

7. The optical member of claim 1, wherein a thickness of a compatible portion of each of the first and second interfaces is equal to or greater than a wavelength of visible light.

8. The optical member of claim 7, wherein the thickness of the compatible portion of each of the first and second interfaces is about 400 nm to about 2 μm.

9. The optical member of claim 1, wherein the substrate is formed of triacetylcellulose (TAC).

10. The optical member of claim 1, wherein a difference between the refractive index of the high refractive layer and the refractive index of the low refractive layer is equal to or higher than 0.05.

11. The optical member of claim 1, further comprising an anti-reflective layer configured to suppress reflection of external light.

12. The optical member of claim 11, wherein the anti-reflective layer is an outermost layer of the optical member.

13. The optical member of claim 11, wherein the anti-reflective layer comprises:
   a binder comprising a photopolymerization product of a mixture of a side-chain reactive photo-polymerizable fluorine polymer and a siloxane compound;
   hollow silica particles included in the binder; and a modified silicone and a photopolymerization product of a one-end reactive photopolymerization productizable fluoropolymer, each being distributed at a surface of the anti-reflective layer.

14. A polarization member comprising:
a polarizer configured to polarize light; and
a functional layer provided on the polarizer, the functional layer comprising a high refractive layer and a low refractive layer,
wherein a refractive index of the high refractive layer is higher than a refractive index of the polarizer, and the high refractive layer has a diffraction grating structure provided at a second interface between the high refractive layer and the low refractive layer,
wherein a refractive index of the low refractive layer is lower than the refractive index of the high refractive layer,
wherein a first interface between the polarizer and the high refractive layer is in a state in which components of the polarizer and the high refractive layer are compatible with each other,
wherein the second interface between the high refractive layer and the low refractive layer is in a state in which components of the high refractive layer and the low refractive layer are compatible with each other, and
wherein the high refractive layer comprises a polymerization product of a monomer configured to be mixed with a component of a substrate.

15. The polarization member of claim 14, wherein the low refractive layer comprises a component configured to be mixed with the high refractive layer.

16. The polarization member of claim 15, wherein the monomer has at least one functional group selected from a morpholino group and an amide group.

17. The polarization member of claim 15, wherein the high refractive layer comprises the polymerization product of the monomer comprising one or two polymerizable functional groups, and the low refractive layer comprises a polymerization product of a monomer comprising three or more polymerizable functional groups.

18. A display device comprising:
a display; and
a functional layer provided on the display, the functional layer comprising a high refractive layer and a low refractive layer,
wherein a refractive index of the high refractive layer is higher than a refractive index of the display, and the high refractive layer has a diffraction grating structure provided at a second interface between the high refractive layer and the low refractive layer,
wherein a refractive index of the low refractive layer is lower than the refractive index of the high refractive layer,
wherein a first interface between the display and the high refractive layer is in a state in which components of the display and the high refractive layer are compatible with each other,
wherein the second interface between the high refractive layer and the low refractive layer is in a state in which components of the high refractive layer and the low refractive layer are compatible with each other, and
wherein the high refractive layer comprises a polymerization product of a monomer configured to be mixed with a component of a substrate.

19. The display device of claim 18, wherein the low refractive layer comprises a component configured to be mixed with the high refractive layer.

* * * * *